July 4, 1939. R. MAHLER Re. 21,140

AUTOMATIC FEED WATER VALVE FOR BOILERS

Original Filed June 5, 1936

Inventor:
Robert Mahler
By Charnwood Company
Attys

Reissued July 4, 1939

Re. 21,140

UNITED STATES PATENT OFFICE 21,140

AUTOMATIC FEED WATER VALVE FOR BOILERS

Robert Mahler, New York, N. Y.

Original No. 2,079,810, dated May 11, 1937, Serial No. 83,709, June 5, 1936. Application for reissue March 7, 1939, Serial No. 260,292

4 Claims. (Cl. 137—101)

In known feed valves for boilers, which are regulated by a float or like means in connection with the boiler pressure, the disadvantage frequently occurs that incrustations form on the valve, giving rise to trouble in the boiler feeding. These boiler incrustations or scale, as is well known, are not deposited in considerable quantity until the water has reached a certain critical temperature; this temperature can nevertheless, with existing feed valves, occur around the valve seat due to the fact that the heat rising from the water, reaches the valve. According to the present invention, this drawback is eliminated in that between the seat of the feed water valve and the mouth of the feed water supply channel, there is arranged in the boiler a vertical or steep-upwardly inclined length of tube, the length of which is considerably greater than the diameter through which feed water is forced to flow upwardly into the boiler in order to prevent the deposit of incrustations on the seat of the valve. Since by reason of the arrangement of the tube connected to the valve casing according to the present invention, the inlet to the boiler is situated at a considerably higher level than the seat of the valve, the heat from the boiler water cannot reach the seat of the valve and the latter is thus always surrounded by cool water. In this way any considerable incrustation which interferes with the function of the valve is safely avoided. It is already known from British specification No. 2,896 of 1909, to use, in feed water valves for boilers valves which were regulated only by hand, wherein one end of a bent member connecting the feed water inlet valve and the return valve, as for instance, a comparatively short piece of tube, is arranged vertically, but this did not prevent the deposit of scale or incrustations around the seat of the feed water valve in any way.

Figure 1:
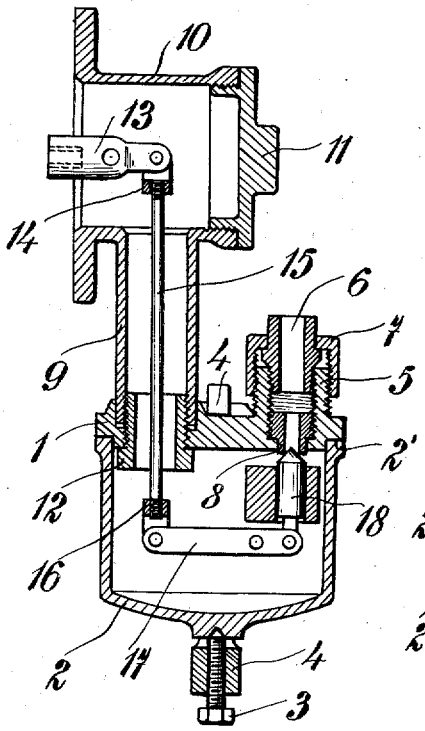
Figure 2:
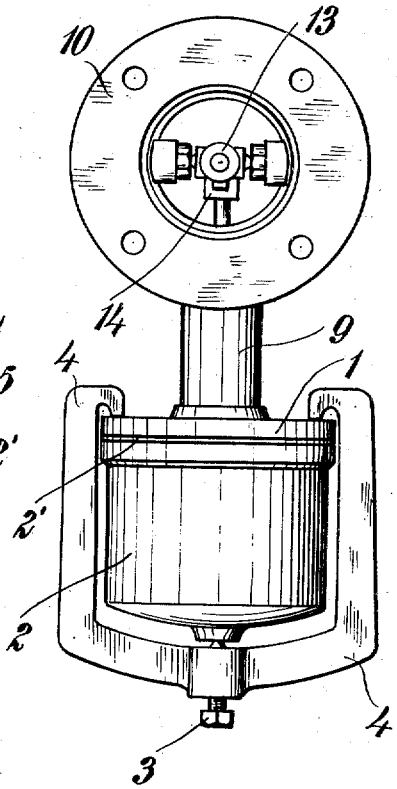

In the accompanying drawing is illustrated a constructional form of the present invention, wherein:

Figure 1 shows a cross-section of a constructional form of the new feed valve and Fig. 2 a side elevation thereof.

The valve casing consists of a lid member 1 and a bowl-shaped body 2 adapted to be readily secured to or released from the lid 1, for instance by a stirrup or like member 4 tightened up by means of a screw 3 and forming a tight joint by means of a washer 2' placed between the body and the lid. On one side of the lid 1 is provided an extension member 5 which carries the connecting piece 6 for the feed water pipe. This connecting piece 6 is secured in position by means of a nut 7. 8 represents the valve seat. The other side of the lid 1 is provided with a bore to receive a tube 9 arranged vertically which tube may be made in one piece with the actual supporting body 10 which is connected to the boiler. The supporting body may be closed by means of a screw-threaded plug or cover 11 or the like. The tubular extension 9 is held in place by means of a screw-threaded union or like member 12.

The float, which is not shown in the drawing, is connected to an arm 13, which is connected by means of a fork-shaped member 14 to a connecting rod 15 which in turn is connected by means of another fork-shaped member 16 to a two-arm lever 17, the other end of which latter carries the valve proper 18. The cone-shaped closing surface of this valve is directed upwardly so that the stream of cold water entering can easily wash away any incrustation, scale or other foreign matter.

The water first flows past the valve seat into the bowl 2 and then through the tube 9 upwardly into the boiler. In this manner the heat from the boiler water cannot reach the seat of the valve, so that none or only a nominal amount of incrustation is formed on the latter. Any scale or incrustation which may be deposited in the chamber through which the feed water enters the feed inlet to the boiler collects in the bowl 2 and can be removed after said bowl has been dismantled. The easily removable bowl 2 also renders the seat of the valve and the connecting rods easily accessible.

Having fully described my invention, what I claim as new and desire to secure by Letters Patent, is:

1. An automatic feed water valve for boilers comprising, in combination, a float arm for extension into a boiler, a casing for direct connection to the boiler, a tube leading substantially vertically downward from said casing, an enlarged chamber connected to said tube and having a considerably larger diameter than said tube, a feed water valve in said enlarged chamber, a cover for said chamber, a valve seat in said cover, an easily detachable bottom for said enlarged chamber and a lever connection leading directly from the float arm through said vertical connecting tube to the feed water valve, the valve seat being arranged so that a stream of water from the water pipe line through the valve is directed downwardly, the valve seat being located at the side of the tube and above the bottom of the chamber.

2. An automatic feed water valve attachment for boilers comprising, in combination, a float arm for extension into a boiler, an attachment for direct connection to a boiler, the upper end portion of said attachment having a discharge passage for directly communicating with the boiler, said attachment having a downwardly extending vertical passage communicating at its upper end with said discharge passage, the lower portion of said vertical passage communicating with a chamber in said attachment extending to one side of said vertical passage, means providing a water inlet into said chamber at a point above the bottom of said chamber and at one side of said vertical passage, whereby in the admission of feed water into the attachment through said inlet and chamber for supply to the boiler, said water passes from said chamber upwardly through said vertical passage and into the boiler thereby substantially preventing the formation of scale at said last named means and further preventing scale, otherwise formed, from contacting said last named means, a valve controlling said last named means, and means involving levers for placing said valve in operative engagement with the float arm to control admission of water into the chamber of the attachment for supply to the boiler.

3. An automatic feed water valve device for boilers comprising an attachment, the upper end of the attachment having a discharge passage for directly communicating with a boiler, said attachment having a vertical passage communicating with and extending downwardly from the discharge passage and opening into a chamber extending laterally at the lower end of said vertical passage, means providing a water inlet into said chamber at a point above the bottom of said chamber and at one side of said vertical passage, a valve cooperating with said water inlet to regulate the admission of feed water into said chamber for supply to the boiler through said vertical and discharge passages, a series of link and lever members arranged in said chamber and passages, placing said valve in operative engagement with a float arm arranged in the discharge passage to the boiler controlled by said device to control admission of water into said chamber for supply to the boiler, and said attachment having an easily detachable member for cleaning out sediment that may collect in the bottom of said chamber.

4. An automatic feed water supply device for apparatus of the character described, said device comprising an attachment, means forming an elongated vertical passage in said attachment opening at the upper end through a discharge into a boiler controlled thereby, means forming a laterally extending chamber communicating with the lower end of said vertical passage, said chamber forming means having a top wall disposed at one side of the vertical passage, means in said top wall and at one side of the vertical passage for admitting feed water into said chamber, a float actuated valve automatically controlling the last named means to admit feed water into the boiler in connection with which the attachment is employed, said feed water passing from said chamber of the attachment through said vertical passage and out through said discharge, and the arrangement of the valve and last named means with respect to the bottom of said chamber and said vertical passage maintaining said valve substantially free from the formation or deposit of scale thereon.

ROBERT MAHLER.